United States Patent Office 3,560,388
Patented Feb. 2, 1971

3,560,388
MAGNETIC COATING COMPOSITION WITH THREE COMPONENT EPOXY BINDER
Louis M. Higashi, Monte Sereno, Calif., assignor to Memorex Corporation, Santa Clara, Calif., a corporation of California
No Drawing. Continuation-in-part of application Ser. No. 735,997, June 11, 1968, which is a continuation-in-part of application Ser. No. 619,017, Feb. 27, 1967. This application July 22, 1969, Ser. No. 843,842
Int. Cl. H01j 1/37
U.S. Cl. 252—62.54
5 Claims

ABSTRACT OF THE DISCLOSURE

A fluid, heat curable magnetic coating composition in which magnetic particles are dispersed in a three component thermosetting epoxy binder. The coating also contains volatile solvents. The epoxy binder contains (1) a high equivalent weight epoxy with a molecular weight of about 400–4,000 per epoxy group, (2) a low equivalent weight epoxy with a molecular weight of about 130–211 per epoxy group, and (3) an aromatic polyamine curing agent having at least two primary amine groups per molecule.

---

This application is a continuation-in-part of my copending application Ser. No. 735,997, filed June 11, 1968, now Pat. No. 3,474,073 which was in turn a continuation-in-part of my application Ser. No. 619,017, filed Feb. 27, 1967, the latter being abandoned.

SUMMARY OF INVENTION

Magnetic coating compositions have been made with a wide variety of binder systems both thermoplastic and thermosetting, and many of these magnetic coatings have very desirable properties for particular applications. However, substantially all of these magnetic coatings have disadvantages from the standpoint of their magnetic properties, their physical ability to withstand abrasion, and their processing characteristics, that is the techniques which are required for their application to supporting members.

The requirements of a magnetic coating composition are particularly stringent where the composition is to be employed for making the magnetic recording layers for "flying head" memories such as the IBM 1311 and 2311 Disk Storage drives. In memories of this type, a magnetic layer is provided on a rigid disk, usually made of aluminum, and the disk is rotated at speeds of about 1,500 r.p.m. while a magnetic head is supported adjacent to the disk and caused to fly aerodynamically over the disk surface. These high rotational speeds of the disk, together with the high relative speeds of head and disk surface cause most magnetic coatings to shed magnetic oxide and cause damage to the magnetic heads and coatings. Lack of hardness, adhesion to aluminum, impact resistance, toughness and resistance to solvents which are commonly used in cleaning the disks are other shortcomings frequently encountered with most magnetic coatings.

In accordance with the invention of my earlier application mentioned above, a magnetic coating composition was provided which is particularly useful as the magnetic coatings for the memory storage disks of the above-mentioned type. The coating provides a magnetic recording surface on the disk with sufficiently good mechanical properties that the coated disks can be used substantially indefinitely without head crashing and without loss of magnetic signals. Additionally, the coatings are resistant to the solvents commonly used in cleaning the disks, and the coatings may be applied to disks by a wide variety of techniques including spin coating, roll coating, knife coating, and spray coating.

The magnetic coatings of my above-mentioned application included four components, namely a high equivalent weight epoxy polymer and a low equivalent weight epoxy polymer similar to those used in this invention and a curing agent in the form of a mixture of an alkylated amine aldehyde condensation product and a primary amine.

In accordance with this invention a tough, non-dusting coating with excellent solvent resistance and good adhesion to aluminum and flexible substrates is prepared by curing a magnetic dispersion containing a binder of a mixture of a high equivalent weight epoxy polymer, a low equivalent weight epoxy polymer and an aromatic polyamine having at least two primary amine groups per molecule. The coating composition of this invention may be used to make magnetic recording tape, but its most important value is appreciated when it is used for making rigid magnetic recording discs.

The high equivalent weight epoxy polymer has an average of between one and three epoxy groups per molecule and a molecular weight per epoxy group of between about 400–4,000. Preferably the high equivalent weight epoxy polymer is a condensation polymer of epichlorohydrin and bisphenol A having the general formula

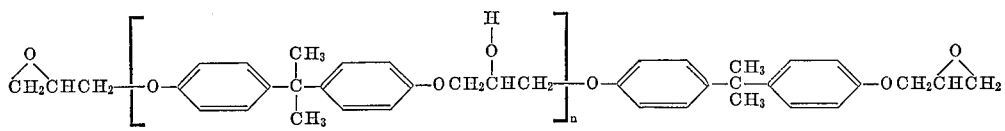

where $n$ is an integer between about 2 to 10. The preferred condensation polymer of epichlorohydrin and bisphenol A which is employed in the practice of this invention is a product sold by the Shell Chemical Company under the trademark Epon 1007 which has an epoxide equivalent of 1,900–2,450 and melting point of 125–134° C. Other polymers which may be used in place of the Epon 1007 are Shell Chemical Company Epon 1001, having an epoxide equivalent weight of 425–550 and melting point of 65–75° C., and Dow Chemical D.E.R. 661 or D.E.R. 667, Ciba Araldite 485E or 6071, Union Carbide Plastics ERR–2011, General Mills Gen Epoxy 525 or 1800, Jones-Dabney Epi-Rez #520 or 201 and Reichhold Epotuf 6301 or 6503-55. Additionally, the following commercially available polymers may be used in lieu of the Epon 1007: Shell Epon 1004, General Mills Gen Epoxy 925, Dow D.E.R. 664, Ciba Araldite 6084, Union Carbide Plastics ERR 2013, Jones-Dabney Epi-Rez 530–C and Reichhold Epotuf 6304.

The preferred high equivalent weight epoxy polymers for use in coating rigid discs have an epoxide equivalent weight (EEW) between 2,000 and 2,500 since the lower EEW polymers tend to produce embrittlement and reduced toughness, and higher EEW polymers decrease in solubility requiring the use of excessive amounts of solvents.

The low equivalent weight epoxy polymer contains an average of between three and four epoxy groups per molecule and has a molecular weight per epoxy group of between about 130–211. The preferred low equivalent weight epoxy polymer is an epoxylated phenolic novolac sold by the Dow Chemical Company under the trademark D.E.M. 438 and has the general formula

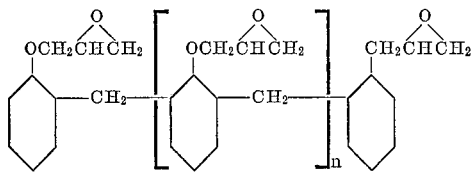

where $n$ has an average value of 1.6 D.E.N. 438 has an average molecular weight of 571 and an average equivalent weight of 159. In plce of the D.E.N. 438 the following commercially available plastics may be used: Dow Chemical D.E.N. A85 and D.E.N. EK85 which are 85% solids solution in acetone and methylethylketone respectively, Ciba EPN 1138 and EPN 1139, and Union Carbide Plastics ERR–0100, Shell Epon 154, and Jones-Dabney Epi-Rez 5155.

The preferred aromatic polyamine is a material sold by Upjohn Chemical Company under the trademark Curithane 103. This material is a polymethylene polyphenylamine having the general formula

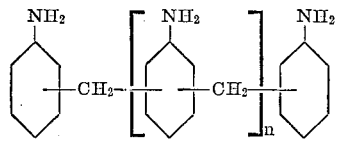

where $n$ has an average value of about 0.3 so that the material has an equivalent weight of 50.4.

In place of the Curithane 103, the following aromatic polymers may be used: m-xylyenediamine, m-phenylenediamine, 2,4 toluene diamine, 4,4' methylene dianiline, and diaminodiphenyl-sulfone.

When the epoxy binder is thermally cured, the amine groups in the polyamine react with the epoxy groups in the two epoxy ploymers to provide a thermoset polymer matrix which is adherent to substrates such as aluminum and which forms an excellent binder for the magnetic particles. The amine and epoxy polymers are preferably provided in approximately stoichiometric quantities, but an excess of either can be used, that is the epoxy polymers are present in a sufficient amount that the combined number of epoxy groups in the polymers is between about 0.5 and 1.5 times the total number of hydrogen atoms on the primary groups in the polyamine.

The two epoxy polymers are preferably employed in sufficient amounts that they contribute approximately equal numbers of epoxy groups to the coating composition, and these amounts may be varied to some extent so that the ratio of the number of epoxy groups in the high equivalent weight polymer to the number of epoxy groups in the low equivalent weight polymer is within the range between about 3 to 1 and 1 to 3. Excessive amounts of the high equivalent weight polymer causes a tendency to dust in the cured epoxy coating, and excessive amounts of the low equivalent weight epoxy polymer results in embrittlement of the coating.

Magnetic coating compositions prepared in accordance with this invention and containing magnetically susceptible particles may be applied to flexible substrates such as Mylar or to rigid substrates such as aluminum or plastic plates employing such techniques as roll coating, knife coating, spin coating, and spray coating.

Magnetic oxide particles are preferably incorporated into such coating compositions in amounts between about 60 and 120 parts by weight of magnetic oxide particles per 100 parts of binder with between 100 and 400 parts of volatile solvents per 100 parts of the combined weight of binder and magnetic oxide particles. Various types of magnetically susceptible pigments may be employed, however, the magnetic pigment which was used in the example set forth below had the following magnetic properties when measured on a 60 cycle hysteresis loop tracer, using a symmetrical cyclic magnetic field of 1,000 oersteds.

Magnetic property: Value
    Residual saturation (Br) _____gauss__1810
    Maximum saturation (Bm) _____do__3450
    Coercive force (Hc) _____oersteds__308

The example following is set forth to better illustrate the preparation of magnetic recording media. All quantities which are presented are parts by weight. Unless specified the solutions were made up on 10/80/10 weight proportions of hexanol/Cellosolve/xylene. Coatings which were applied to aluminum substrates when cured for two to four hours at 220° C. had a horny consistency, were relatively non-dusting, and permitted magnetic heads to fly continuously without crashing.

EXAMPLE

| | Proportions | Solids |
|---|---|---|
| I. Mill base, component: | | |
|   Magnetic oxide | 50.00 | 50.00 |
|   40% Epon 1007 solution | 37.52 | 15.00 |
|   Solvent 10/80/10 | 57.54 | |
|     Totals | 145.06 | 65.00 |
| II. Letdown addition: | | |
|   40% Epon 1007 | 78.60 | 31.44 |
|   85% DEN 438 in MEK | 2.27 | 1.93 |
|   50% Curithane 103 in Cellosolve | 3.26 | 1.63 |
|   Solvent 10/80/10 | 57.12 | |
|     Totals | 141.25 | 35.00 |

Magnetic dispersions were prepared from the foregoing formulation in the following manner:

A mixture of 50.00 parts of magnetic pigment and 57.54 parts of a solvent system consisting of 10/80/10 parts by weight hexanol/cellosolve/xylene were mixed with a high shear mechanical stirrer and allowed to wet out by standing overnight. Subsequently, 37.52 parts of 40% Epon 1007 solution in Cellosolve were added to the slurry and ball milled for approximately 24 hours until free of agglomerates. This mill base was then let down with a mixture containing 2.27 parts of 85% DEN 438 solution in MEK, 78.60 parts of 40% Epon 1007 in 10/80/10 solvent, and 3.26 parts of 50% Curithane 103 in Cellosolve and stirred at high shear. Finally, 57.12 parts of 10/80/10 were added for viscosity adjustment to approximately 350 cps. at 25° C. as measured with a Brookfield viscometer using a number 2 spindle at 20 r.p.m. and applying shear for one minute. The magnetic dispersions were applied to aluminum disc substrates, and cured for three hours at 220° C. resulting in a coating thickness of approximately 250 microinches. Subsequently, the coatings were polished to a surface smoothness of approximately two to three microinches. The finished discs all flew magnetic heads satisfactorily at 1,500 r.p.m. with negligible shedding of oxide, and recovered rapidly when the heads were allowed to crash against the surface.

Discs made in accordance with the above example were tested and compared with three other discs, namely Discs A and B made in accordance with the four component formulation of my above mentioned applications and Disc C which is a commercially available disc made from a four component formulation comprised of Epon 1004, hexahydrophthalic anhydride, an allylether of methylolphenol, and polyvinylmethylether. The following table gives the results of these tests.

TABLE I

| | Example I | Disc A | Disc B | Disc C |
|---|---|---|---|---|
| Mar test (grams) | >5,000 | 5,000 | 3,000 | 5,000 |
| Taber abrasion (mg.) | 14.3 | 15.5 | 6.0 | 15.0 |
| Head recover times (secs.) | 1.0 | 1.0 | 1.0 | 1.0 |
| Dusting | (1) | (1) | (1) | (1) |
| Isopropanol sensitivity | (2) | (2) | (2) | (2) |
| Consistency | (3) | (3) | (3) | (3) |
| Heat softening point (° C.) | 74 | 72 | 100 | 78 |
| Knoop hardness (100 g.) | 59.2 | 55.0 | 55.8 | 64.9 |

[1] Light. [2] Slight. [3] Horny.

I claim:
1. A magnetic coating composition containing magnetically susceptible particles dispersed in a fluid thermosetting binder where said binder comprises an intimate admixture of:
(A) a high equivalent weight epoxy polymer containing an average of between 1 and 3 epoxy groups per molecule and a molecular weight per epoxy group of between about 400 and 4,000,
(B) a low equivalent weight epoxy polymer containing an average of between 3 and 4 epoxy groups per molecule and a molecular weight per epoxy group of between about 130 and 211, and
(C) an aromatic polyamine having at least 2 primary amine groups per molecule,
(D) said epoxy polymers being provided in sufficient amounts that the ratio of the number of epoxy groups in the high equivalent polymer to the number of epoxy groups in the low equivalent weight polymer is within the range between 3 to 1 and 1 to 3, and
(E) said polymers being present in sufficient amounts that the combined number of epoxy groups in said polymers is between about 0.5 and 1.5 times the total number of amine hydrogen atoms in said polyamine.
2. The magnetic coating composition of claim 1 in which:
(A) said high equivalent weight epoxy polymer is a condensation polymer of epichlorohydrin and bisphenol A having the general formula

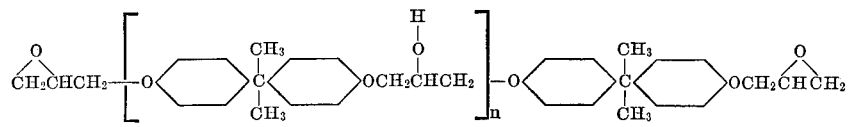

where $n$ is an integer from 2 to 10;
(B) said low equivalent weight epoxy polymer in an epoxylated phenolic novolac having the general formula

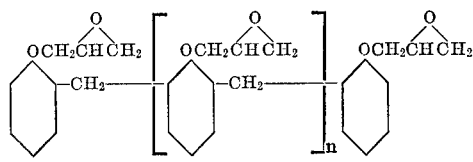

where the average value of $n$ is about 1.6; and
(C) said polyamine has the general formula

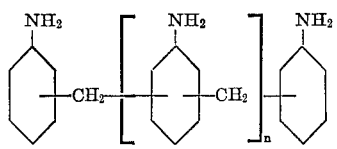

where $n$ has an average value of about 0.3.
3. The coating composition of claim 2 in which:
(A) said high equivalent weight epoxy polymer has an epoxide equivalent weight between 2,000 and 2,500,
(B) said high equivalent weight epoxy polymer is present in a sufficient quantity to provide about twice as many epoxy groups as said low equivalent weight epoxy polymer, and
(C) said polyamine is present in a sufficient amount to provide about the same number of amine hydrogens as the number of epoxy groups in said polymers.
4. A magnetic recording member comprising:
(A) a substantially rigid disc formed of a non-magnetic material, and
(B) a heat cured coating on said disc with said coating containing magnetically susceptible particles bound in a binder where said binder contains chemically reacted together
(1) a high equivalent weight epoxy polymer containing an average of between 1 and 3 epoxy groups per molecule and a molecular weight per epoxy group of between about 400 and 4,000,
(2) a low equivalent weight epoxy polymer containing an average of between 3 and 4 epoxy groups per molecule and a molecular weight per epoxy group of between about 130 and 211, and
(3) an aromatic polyamine having at least 3 primary amine groups per molecule,
(4) said epoxy polymers being provided in sufficient amounts that the ratio of the number of epoxy groups in the high equivalent weight polymer to the number of epoxy groups in the low equivalent weight polymer is within the range between 3 to 1 and 1 to 3, and
(5) the polymers being present in sufficient amounts that the combined number of epoxy groups in said polymers is between about 0.5 and 1.5 times the total number of hydrogen atoms on the primary amine groups in said polyamine.
5. The magnetic recording member of claim 4 in which:
(A) said high equivalent weight epoxy polymer is a condensation polymer of epichlorohydrin and bisphenol A having the general formula

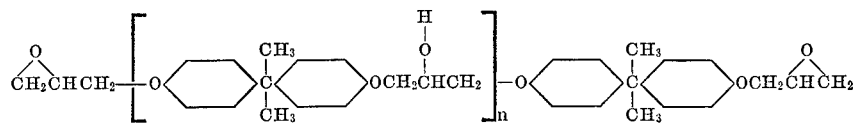

where $n$ is an integer from 2 to 10;

(B) said low equivalent weight epoxy polymer is an epoxylated phenolic novolac having the general formula

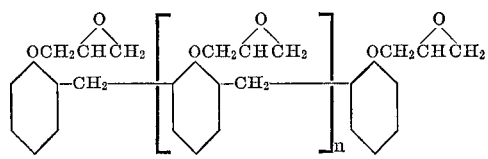

where the average value of $n$ is about 1.6; and (C) said polyamine has the general formula

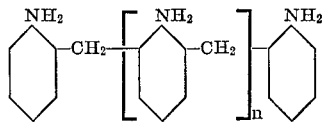

where $n$ has an average value of about 0.3.

References Cited

UNITED STATES PATENTS

| | | | |
|---|---|---|---|
| 3,269,974 | 8/1966 | Childs | 260—37 |
| 3,387,993 | 6/1968 | Flowers | 117—121 |
| 3,371,044 | 2/1968 | Cochardt | 252—62.54 |
| 3,417,069 | 12/1968 | Davis et al. | 260—92.3 |

TOBIAS E. LEVOW, Primary Examiner

A. P. DEMERS, Assistant Examiner

U.S. Cl. X.R.

117—235; 260—830